May 15, 1951  N. D. STANLEY, SR., ET AL  2,552,745
ADJUSTABLE SIGN STAKE
Filed Aug. 29, 1947
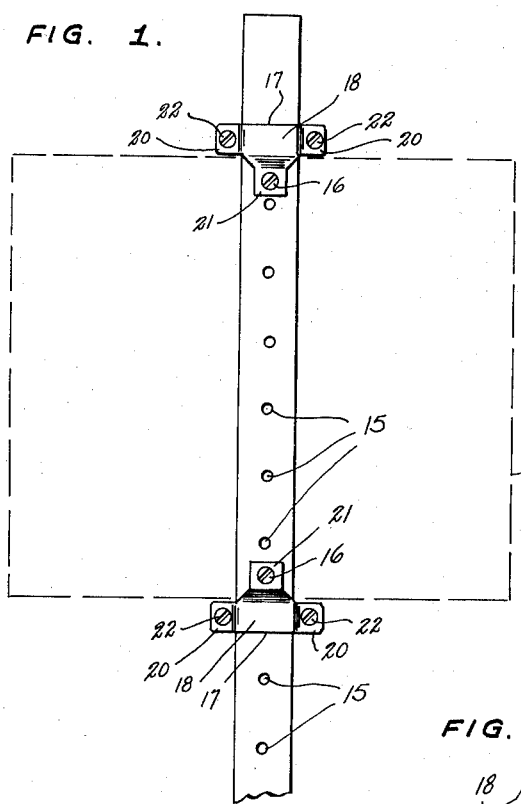
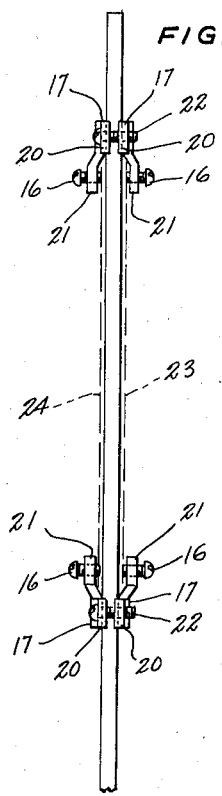
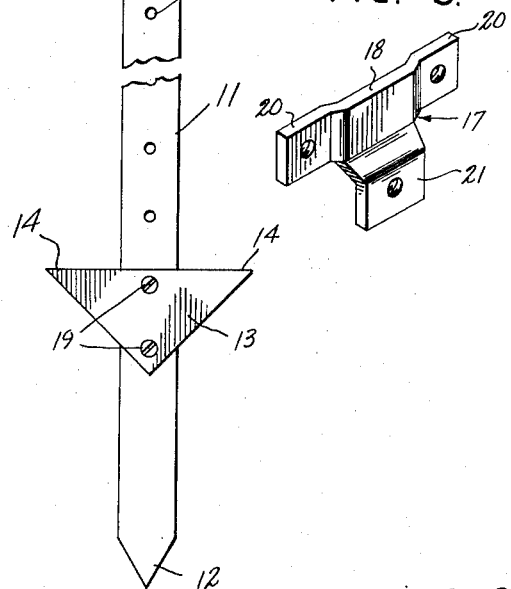
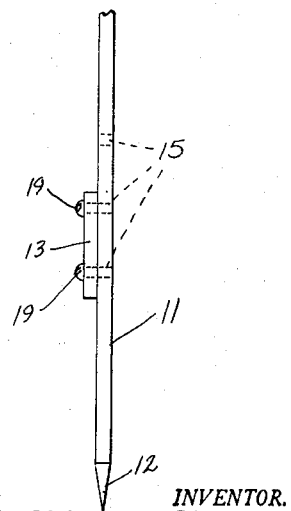
INVENTOR.
NOBE D. STANLEY, SR.
IRVINE M. RICHARDSON,
BY
McMorrow, Berman & Davidson
ATTORNEYS.

Patented May 15, 1951

2,552,745

UNITED STATES PATENT OFFICE 2,552,745

ADJUSTABLE SIGN STAKE

Nobe D. Stanley, Sr., and Irvine M. Richardson, Fayetteville, N. C.

Application August 29, 1947, Serial No. 771,308

3 Claims. (Cl. 40—145)

This invention relates to sign supports and more particularly to a ground-engaging post device adapted to support one or more signs thereon.

A main object of the invention is to provide a novel and improved sign supporting post which is very simple in construction, easy to install in the ground and provided with adjustable means for securing signs thereto.

A further object of the invention is to provide an improved sign post provided with sign securing means which is inexpensive to manufacture, sturdy in construction and readily adjustable in accordance with the dimensions of the signs to be supported thereon.

Further objects and advantages of the invention will become apparent from the following description and claims, and from the accompanying drawings, wherein:

Figure 1 is a front elevational view of a sign-supporting post or stake constructed in accordance with the present invention.

Figure 2 is a side elevational view of the sign-supporting device of Figure 1.

Figure 3 is an enlarged perspective detail view of a clamping bracket employed with the sign-supporting device of Figure 1.

Referring to the drawings, 11 designates an elongated stake member formed with a sharpened bottom tip 12 to facilitate ground penetration of the stake. Secured to the lower portion of stake 11 is a triangular plate member 13 having laterally projecting side portions 14, 14 adapted to be engaged by the foot of the person driving the stake into the ground, whereby the stake may be rapidly set in a vertical position in the ground.

Stake 11 is formed substantially for its full length with uniformly spaced openings 15. The plate member 13 is secured to the stake at selected pairs of adjacent openings 15 by bolts 19, 19 whereby any desired degree of ground penetration of the stake may be obtained. In the illustrated embodiment of the invention the plate 13 is secured at the lowermost pair of openings 15, 15.

Engaging the upper portion of the stake are pairs of brackets 17, 17. Each bracket 17 has a central bowed portion 18 and side wings 20, 20. Projecting from central portion 18 and outwardly offset therefrom is a lug 21 which is threaded to receive a screw 16. In the illustrated embodiment of the invention there are two brackets 17 clamped to the upper portion of the stake 11 by bolts 22, 22 passing through their wing portions 20, 20, the lugs 21 thereof projecting downwardly. There are also two brackets 17 clamped to the intermediate portion of the stake 11 in the same manner except that their lugs 21 project upwardly. A sign 23 is engaged under the lugs 21 and clamped to the stake 11 by the screws 16 carried by said lugs at one side of the stake and a second sign 24 may be secured to the stake at its other side in the same manner. The brackets 17 are readily adjustable on the stake in accordance with the size of the signs and the desired elevations thereof on the stake.

By employing additional sets of brackets 17 in the same manner as illustrated in the drawings, additional signs may be adjustably secured to the stake 11.

While a specific embodiment of a sign-supporting device has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A sign support comprising a substantially straight elongated stake for engagement in the ground, a pair of opposed clamp plates arranged adjacent to opposite sides of the stake and extending transversely of the stake, the clamp plates including pairs of opposed apertured extensions projecting laterally beyond opposite longitudinal edges of the stake, bolt means carried by the apertured extensions for drawing the clamp plates together against the stake, offset apertured lugs secured to adjacent edges of the clamp plates and spaced laterally of the clamp plates and sides of the stake adjacent to the clamp plates, and set screws carried by the apertured lugs for movement toward and away from the sides of the stake for detachably securing sign cards between the sides of the stake and lugs.

2. A sign support comprising an elongated stake for engagement in the ground, longitudinally spaced pairs of opposed clamp plates disposed adjacent to opposite sides of the stake and extending transversely of the stake, the clamp plates including pairs of opposed apertured extensions projecting laterally beyond opposite longitudinal edges of the stake, bolt means connecting the apertured extensions for drawing the clamp plates of the pairs together against the stake, opposed pairs of offset lugs integrally secured to adjacent transverse edges of the pairs of clamp plates and arranged near the transverse center of the stake and spaced laterally of the sides of the stake, the offset lugs in the pairs having screw-threaded openings extending substantially perpendicular to the stake, and adjustable set screws mounted within the screw-threaded openings of the offset lugs and shiftable toward and away from the stake so that sign cards may be removably clamped between the set screws and adjacent sides of the stake.

3. A sign support comprising an elongated substantially straight flattened stake for engagement in the ground, the stake having opposed flat faces, a pair of opposed generally flat clamp plates disposed adjacent to the flat faces of the stake and extending transversely beyond opposite longitudinal edges of the stake and having aligned apertures, bolts engaging through the aligned apertures of the clamp plates for drawing the clamp plates together against the flat faces of the stake and permitting the clamp plates to be adjusted longitudinally of the stake, opposed offset lugs integrally secured to adjacent transverse edges of the clamp plates and disposed substantially at the transverse center of the flat faces and spaced from such flat faces and extending longitudinally of the stake, the lugs having substantially central screw-threaded openings, and adjustable set screws mounted within the screw-threaded openings of the lugs and shiftable toward and away from the flat faces of the stake so that sign cards may be detachably clamped between the set screws and said flat faces of the stake.

NOBE D. STANLEY, Sr.
IRVINE M. RICHARDSON.

REFERENCES CITED

The following references are of record in the file of this patent:

UNITED STATES PATENTS

| Number | Name | Date |
| --- | --- | --- |
| 1,439,982 | Shranger | Dec. 26, 1922 |
| 1,444,449 | Beck | Feb. 6, 1923 |
| 1,786,883 | Zahonyi | Dec. 30, 1930 |
| 1,851,046 | Horni | Mar. 29, 1932 |
| 2,022,160 | Sorensen et al. | Nov. 26, 1935 |